United States Patent [19]

Sigler

[11] Patent Number: 5,114,238
[45] Date of Patent: May 19, 1992

[54] INFRARED CATADIOPTRIC ZOOM RELAY TELESCOPE

[75] Inventor: Robert D. Sigler, Cupertino, Calif.

[73] Assignee: Lockheed Missiles & Space Company, Inc., Sunnyvale, Calif.

[21] Appl. No.: 545,211

[22] Filed: Jun. 28, 1990

[51] Int. Cl.[5] .................. G02B 23/00; G02B 5/24; G02B 17/00
[52] U.S. Cl. .................. 359/399; 359/357; 359/366; 359/728
[58] Field of Search .................. 350/1.1–1.4, 350/500–505, 537–539, 557–562, 570–573, 415, 422, 440–444, 445, 6.8, 446; 250/330, 352

[56] References Cited

U.S. PATENT DOCUMENTS

| | | | |
|---|---|---|---|
| 3,152,214 | 10/1964 | Korones et al. | 350/503 |
| 3,963,328 | 6/1976 | Abel | 350/443 |
| 4,235,508 | 11/1980 | Kaprelian | 350/505 |
| 4,453,800 | 6/1984 | Fjeldsted | 350/453 |
| 4,507,551 | 3/1985 | Howard et al. | 350/443 |
| 4,523,816 | 6/1985 | Kreitzer | 350/444 |
| 4,600,265 | 7/1986 | Norrie | 350/1.3 |
| 4,658,140 | 4/1987 | Roll et al. | 350/6.6 |
| 4,690,516 | 9/1987 | Kanno | 350/444 |
| 4,714,307 | 12/1987 | Palmer | 350/1.4 |
| 4,834,515 | 5/1989 | Mercado | 350/442 |
| 4,971,428 | 11/1990 | Moskovich | 350/503 |

FOREIGN PATENT DOCUMENTS 2136149 9/1984 United Kingdom ............ 350/537

Primary Examiner—Bruce Y. Arnold
Assistant Examiner—Thong Nguyen
Attorney, Agent, or Firm—John J. Morrissey

[57] ABSTRACT

A catadioptric zoom relay telescope whose refractive elements are made from only a single type of optical glass focuses all wavelengths in a broad infrared bandwidth onto a common focal plane with diffraction-limited imagery throughout a changing focal ratio (i.e., a zoom range) from less than f/1.5 to more than f/6.0.

15 Claims, 8 Drawing Sheets

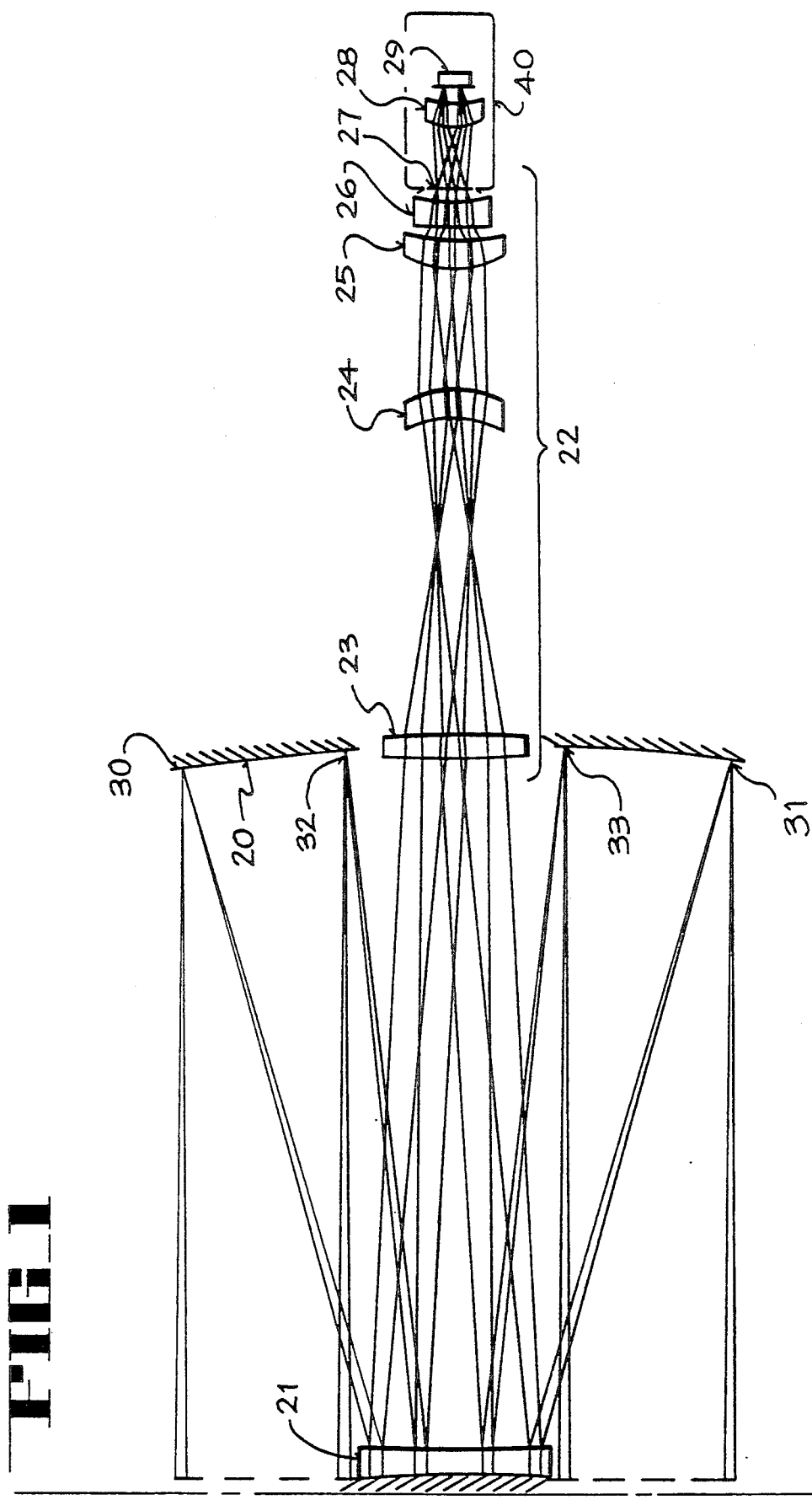
FIG_1

FIG_2
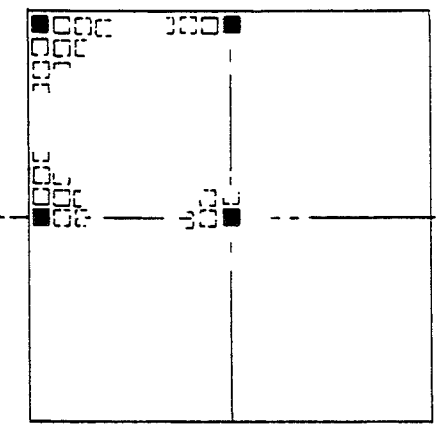
FIG_3
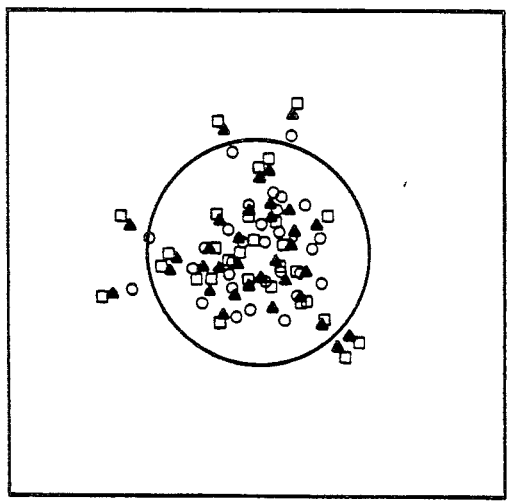
RMS = .0139
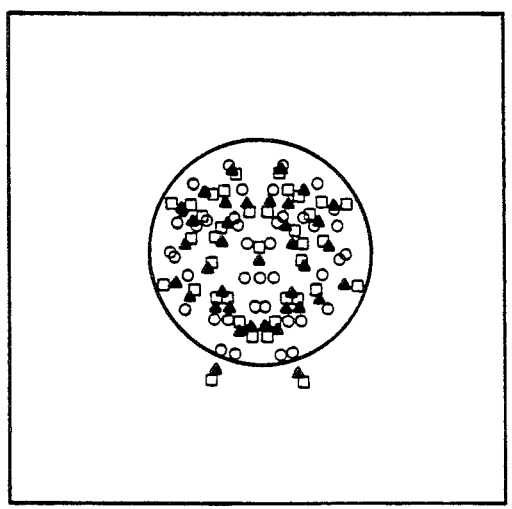
RMS = .0139
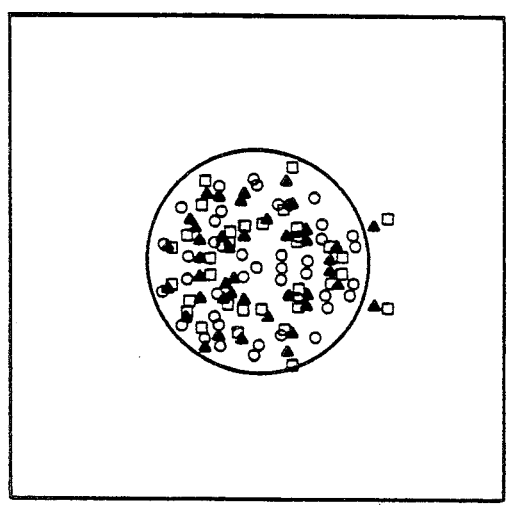
RMS = .0139
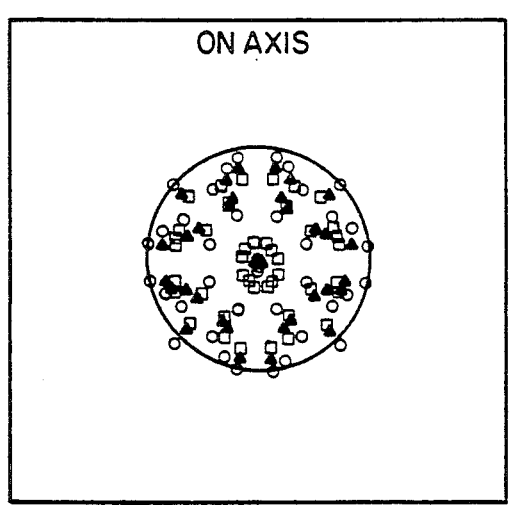
ON AXIS
RMS = .0150

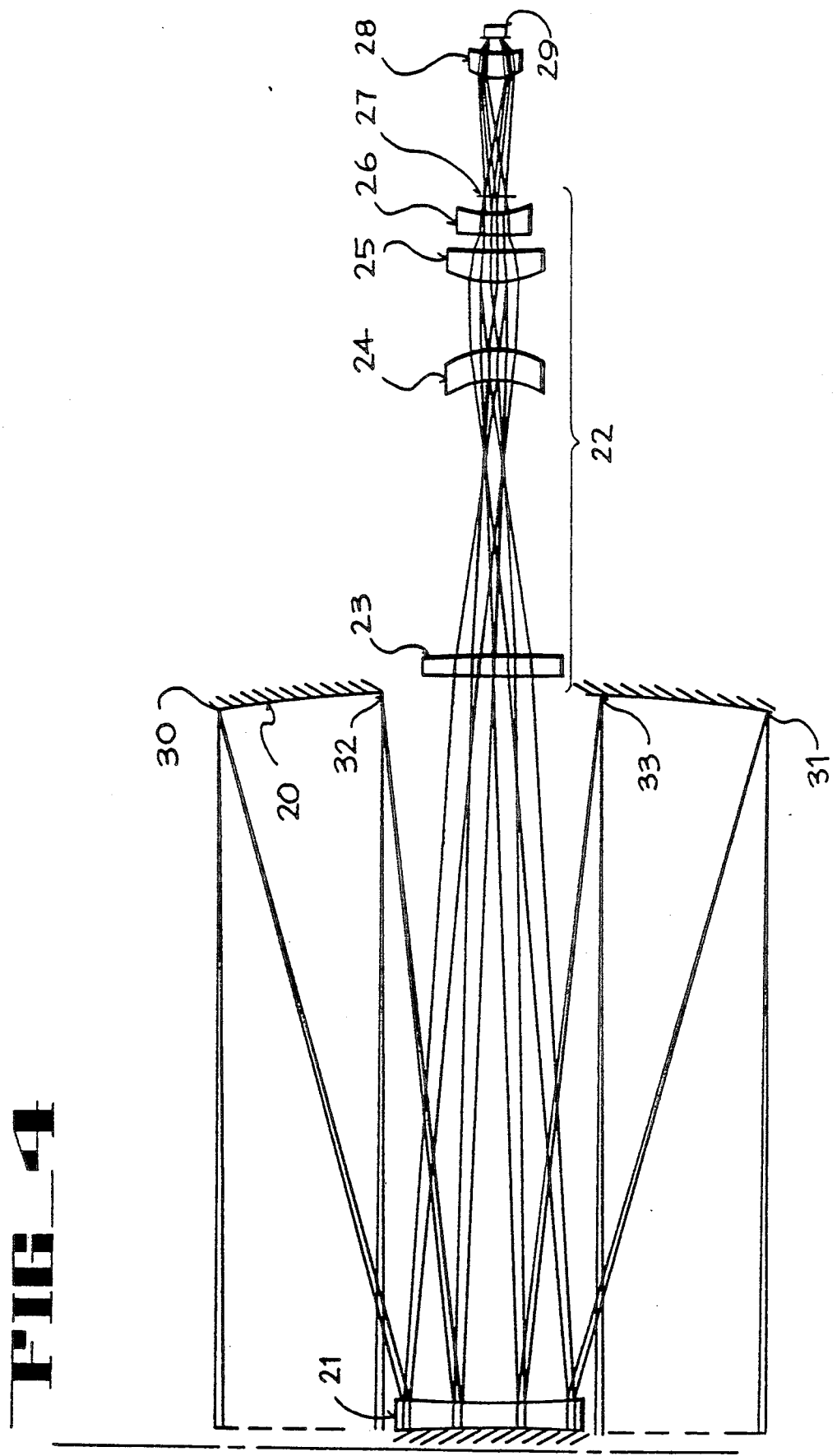

FIG_5
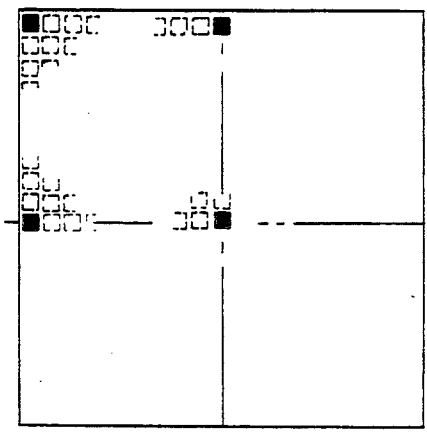
FIG_6
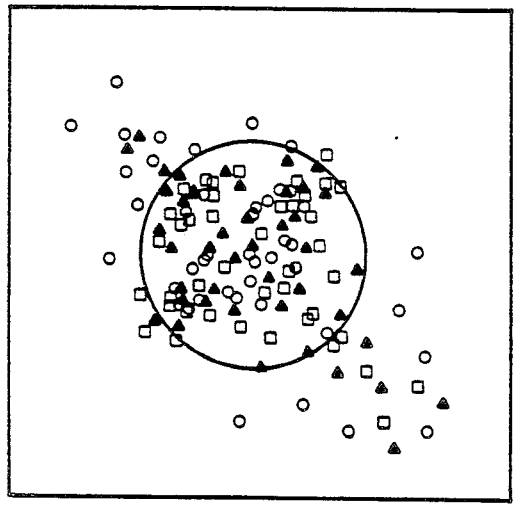
RMS=.0443
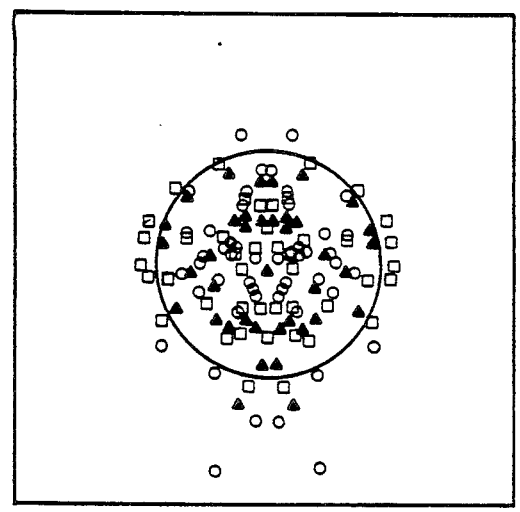
RMS=.0346
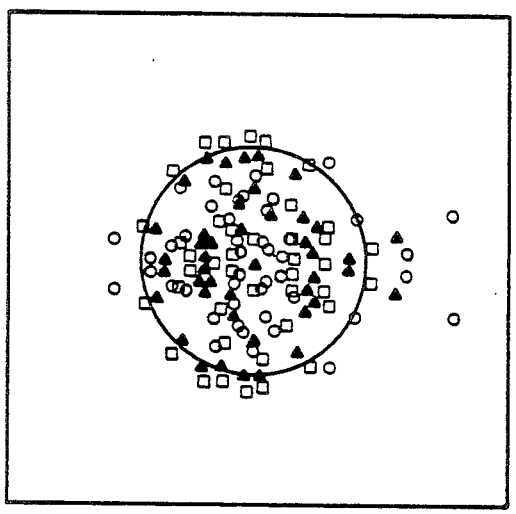
RMS=.0346
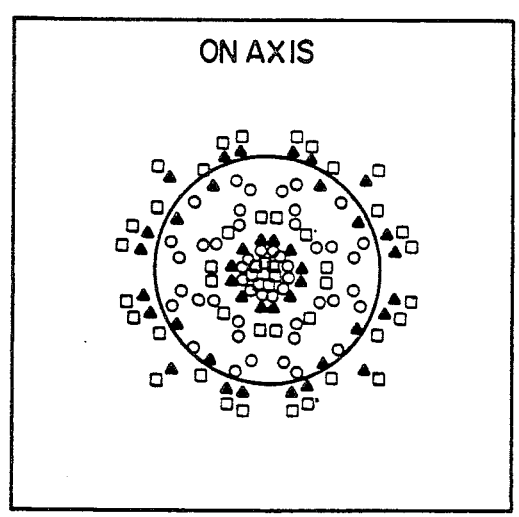
RMS=.0374

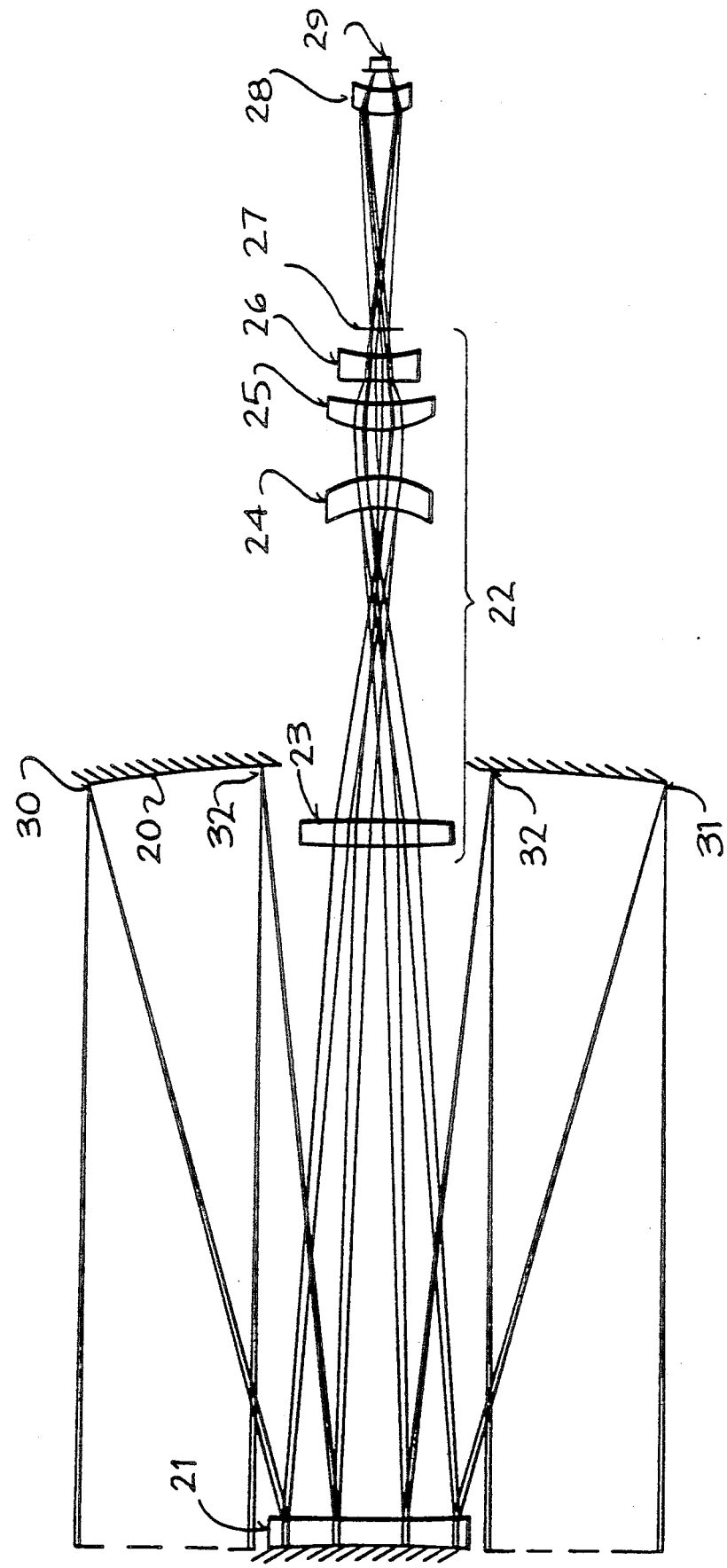
FIG_7

FIG_8
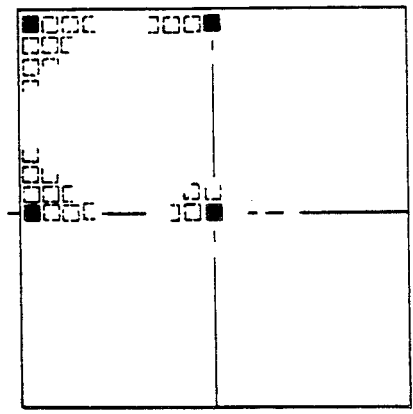
FIG_9
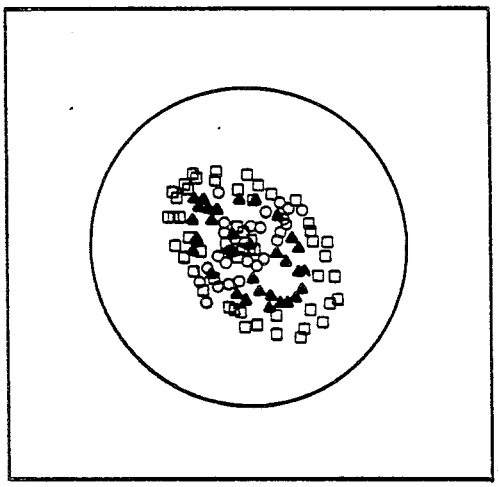
RMS=.0235
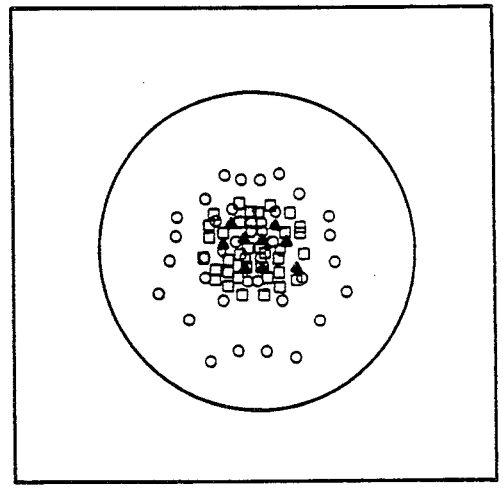
RMS=.0186
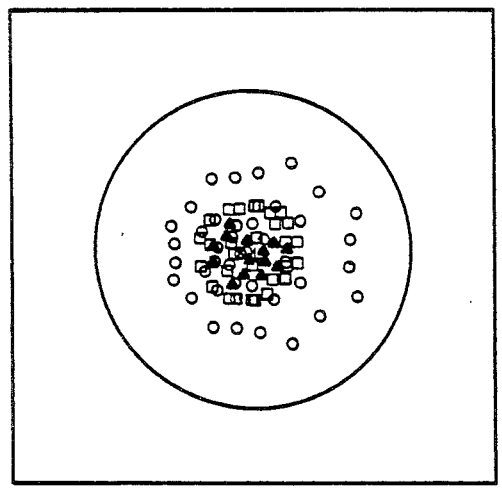
RMS=.0186
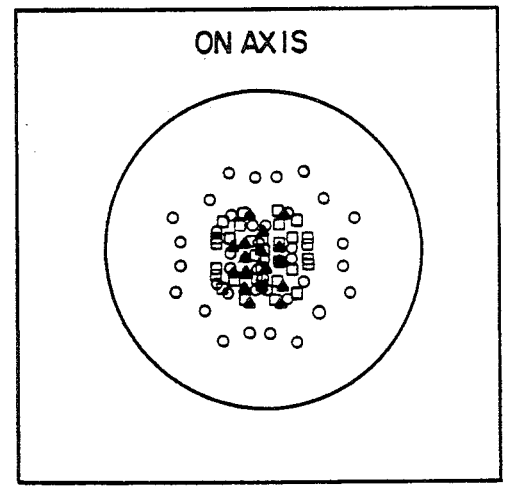
ON AXIS
RMS=.0178

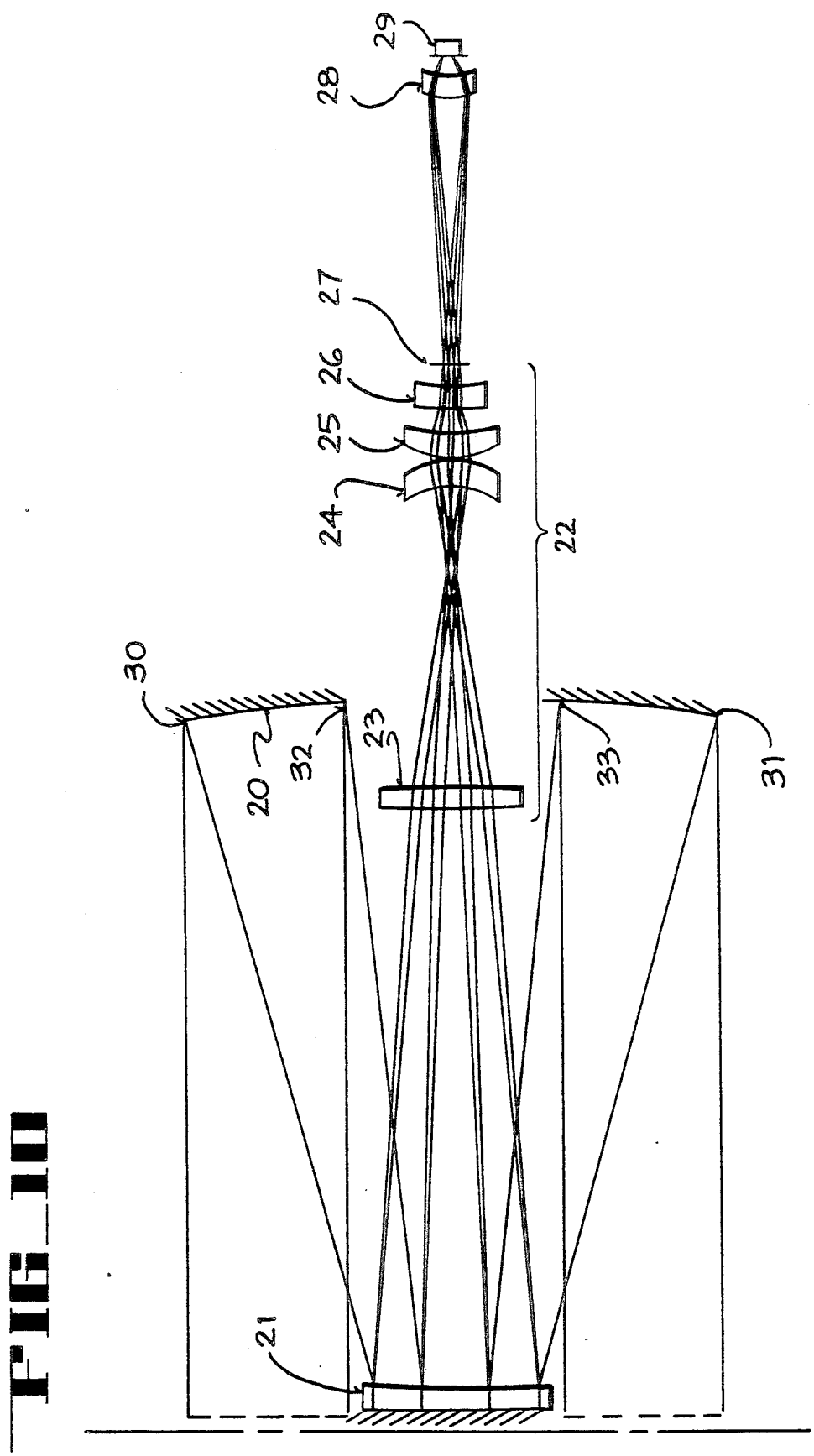
FIG_10

FIG_11
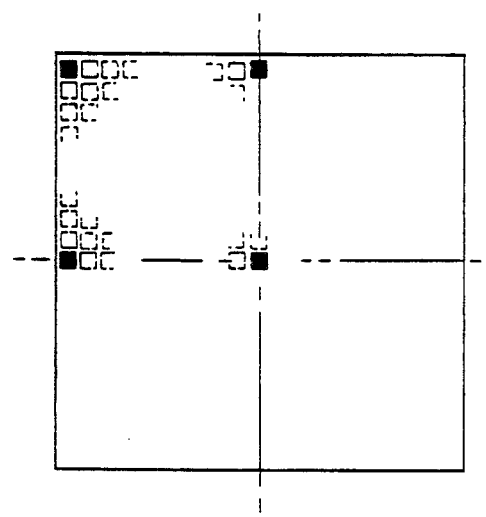
FIG_12
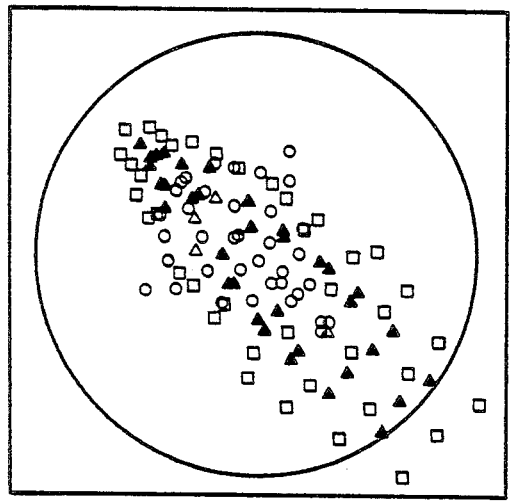
RMS = .0461
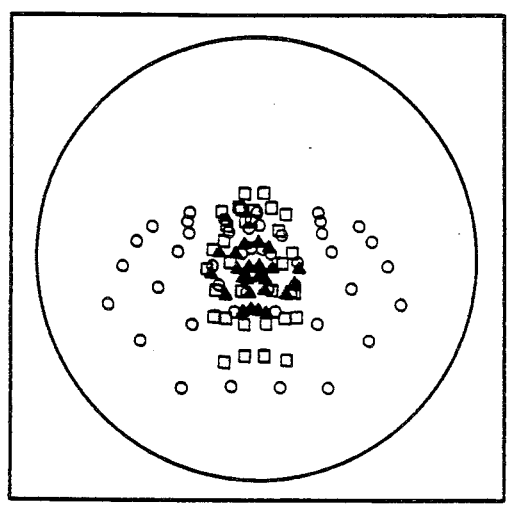
RMS = .0254
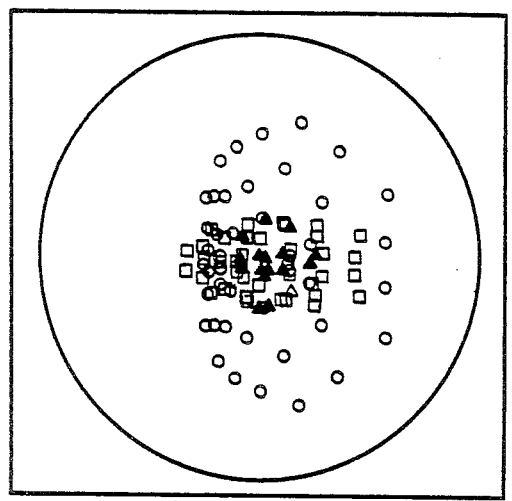
RMS = .0254
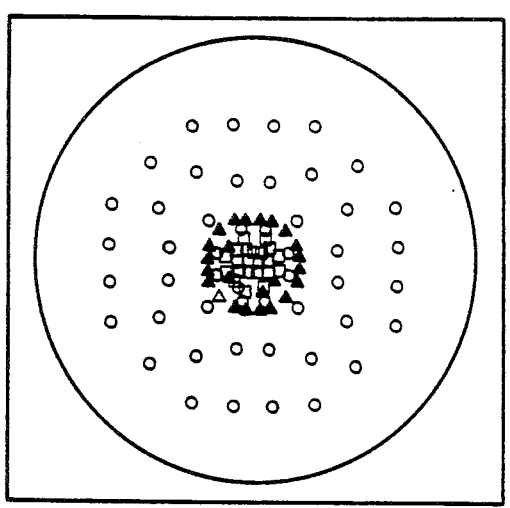
RMS = .0280

INFRARED CATADIOPTRIC ZOOM RELAY TELESCOPE

TECHNICAL FIELD

This invention relates generally to zoom relay telescopes, and more particularly to a catadioptric zoom relay telescope capable of focussing wavelengths in a broad infrared spectral bandwidth onto a common focal plane throughout a range of focal lengths corresponding to changes in focal ratio from less than f/1.5 more than f/6.0 while maintaining a fixed entrance pupil diameter.

PRIOR ART

In infrared imaging applications, it is frequently necessary to be able to change focal length (i.e., to "zoom") continuously over a wide range of changes in focal ratio while maintaining a fixed entrance pupil diameter, and while focussing all wavelengths in a broad spectral bandwidth (typically in a band from 3 to 5 microns, or in a band from 8 to 12 microns) onto a common focal plane. Infrared imaging systems of the prior art have generally been dioptric (i.e., constructed entirely of refractive components), rather than catoptric (i.e., constructed entirely of reflective components) or catadioptric (i.e., constructed of a combination of reflective and refractive components).

Dioptric zoom telescopes have functioned satisfactorily in infrared applications in which the entrance pupil diameter is less than about six inches. However, it is generally impractible (because of size and weight considerations) for an infrared telescope having an entrance pupil diameter larger than about six inches to be constructed entirely of refractive components. Furthermore, refractive components made of such commonly used infrared-transmissive materials as germanium and silicon are not readily available in sizes sufficiently large to accommodate apertures larger than about six inches. When angular resolution requirements made it necessary in the prior art for an infrared telescope to have an entrance pupil larger than about six inches, it was customary to use a catadioptric design in which a "front end" catoptric telescope (typically of the Cassegrain or Gregorian type) was combined with a dioptric zoom "re-imager" consisting of a large number of lens elements—many having aspherical surfaces.

In most infrared applications, it is desirable (and often necessary) to suppress background radiation at the detector. Ordinarily, the suppression of background radiation at the detector of an infrared telescope is accomplished by cooling the optical elements and the associated detector to a very low temperature—sometimes to a cyrogenic temperature. However, in large-aperture infrared applications (i.e., were the entrance pupil diameter is larger than about six inches), the amount of power required to cool all the optical elements as well as the associated detector sufficiently to suppress background radiation would usually be unacceptably large.

A catadioptric zoom relay telescope for use at visible wavelengths is disclosed in (and illustrated in FIG. 4 of) U.S. Pat. No. 3,529,888, which was granted to R. A. Buchroeder in 1970. The Buchroeder telescope is capable of focussing visible wavelengths onto a common focal plane throughout a range of focal lengths (i.e., a zoom) corresponding to a range of changes in focal ratio from f/12 to f/60, while maintaining a fixed entrance pupil diameter. The surfaces of the reflective and refractive elements of the Buchroeder telescope are all spherical. Nevertheless, the catadioptric zoom relay telescope of Buchroeder is quite complex in construction, requiring two mirrors (one of which is a Mangin mirror) and ten lens elements (one of which is cemented to the lens portion of the Mangin mirror). Furthermore, the catadioptric zoom relay telescope of Buchroeder requires three different types of optical glasses for the refractive elements. In operation, the catadioptric zoom relay telescope of Buchroeder is quite slow (i.e., focal ratios in the range of operability are very large) and is limited to visible wavelength imagery. In the prior art, there were no catadioptric zoom telescopes of relay design for use at infrared wavelengths.

In an article entitled "All-Spherical Catadioptric Telescope with Small Corrector Lenses", published in *Applied Optics*, Vol. 21, pages 2804–2808, (Aug. 1, 1982), R. D. Sigler disclosed a number of examples of designs for catadioptric relay telescopes operable at infrared wavelengths. The infrared catadioptric relay telescope designs of the Sigler article have two mirrors (one of which is a Mangin mirror) and only two lens elements, where the lens component of the Mangin mirror and both of the lens elements are made from a single type of optical glass. All of the lens and mirror surfaces of the Sigler infrared catadioptric relay telescope designs are spherical, and the lens elements are arranged in a relay configuration. The infrared catadioptric relay telescope designs of the Sigler article are well-corrected for monochromatic aberrations, and for both lateral and axial chromatic aberrations at visible and infrared wavelengths. However, the Sigler article does not disclose any design for a zoom relay telescope.

Until the present invention, no catadioptric zoom relay telescope with only spherical reflective and refractive surfaces, and with refractive elements that are small relative to the size of a fixed entrance pupil, had been designed that could achieve a continuously variable focal length over a broad infrared spectral bandwidth while maintaining diffraction-limited imagery on a stationary focal plane.

SUMMARY OF THE INVENTION

It is a general object of the present invention to provide a catadioptric zoom relay telescope with a fixed entrance pupil diameter that is capable of achieving a continuously variable focal length over a broad band of infrared wavelengths, while maintaining substantially diffraction-limited imagery on a stationary focal plane.

It is a particular object of the present invention to provide a relatively simple catadioptric zoom relay telescope with a fixed entrance pupil diameter, whose refractive elements are made from only a single type of inexpensive optical material, which is capable of focussing all wavelengths in the infrared band from 8 to 12 microns onto a common focal plane with diffraction-limited imagery throughout a range of changes in focal ratio (i.e., a zoom range) extending from less than f/1.5 to more than f/6.0.

Color correction of a catadioptric zoom relay telescope is achieved according to the present invention by designing individual lens elements of the telescope so as to have paraxial marginal ray heights such that contributions to chromatic aberration attributable to the individual lens elements effectively cancel each other, rather than by matching dispersion properties of different optical materials so as to correct for chromatic aberration. Consequently, only a single type of optical material is needed for the refractive elements of the telescope. The technique of designing paraxial marginal ray heights for the individual lens elements in order to achieve color correction in a broad wavelength band for the telescope is discussed in detail in the aforementioned Sigler article.

In design form, a catadioptric zoom relay telescope according to the present invention is quite simple, comprising only two mirrors (one of which is a Mangin mirror) and five lens elements (viz., four lens elements functioning as an imaging system and a fifth lens element functioning as a field lens element), all of which have spherical surfaces. The five lens elements are small relative to the entrance pupil diameter, which can be larger than six inches—and in particular applications can be as large as 40 inches or even larger. A catadioptric zoom relay telescope according to the present invention is compact (i.e., the physical length of the telescope is less than the shortest focal length at which the telescope is operable), and is "fast" (i.e., the focal ratio is only about f/1 at the shortest focal length at which the telescope is operable).

Ordinarily, the primary mirror of a catadioptric telescope functions as the entrance pupil. For a catadioptric telescope of "non-relay" design, the lens elements do not form a real image of the entrance pupil (i.e., an image of the primary mirror). However, for a catadioptric zoom telescope according to the present invention, which is of "relay" design, the lens elements comprising the imaging system form a real image of the entrance pupil (i.e., an image of the primary mirror) at an intermediate plane, which is located ahead (i.e., "upstream", or perhaps the better metaphor would be "up beam") of an image plane onto which the field lens element focusses the image.

In general, when the exit pupil of an optical system coincides with an aperture that is defined by a physical structure (e.g., a hole in a opaque plate), the structure defining the aperture that coincides with the exit pupil is called a Lyot stop. For a catadioptric zoom relay telescope according to the present invention, the intermediate plane on which the image of the entrance pupil (i.e., the image of the primary mirror) is formed functions as a Lyot stop. Radiation passing through the Lyot stop is focussed by the field lens element onto a detector located at the image plane. The Lyot stop changes position as the positions of the lens elements comprising the imaging system are changed, which occurs as the telescope "zooms" through a range of preselected focal lengths. However, the positions of the field lens element and of the detector relative to the mirrors remain fixed as the telescope "zooms" through the range of preselected focal lengths.

In accordance with the "relay" design of a catadioptric zoom telescope of the present invention, the real internal exit pupil (i.e., the Lyot stop), which is very much smaller than the entrance pupil (i.e., the primary mirror), is imaged onto the detector. In most infrared applications, it is sufficient merely to cool the lens elements located between the Lyot stop and the detector in order to obtain adequate suppression of background radiation at the detector. In such applications, the amount of power required to cool the optical elements and the detector, as well as the weight of the cooling apparatus, can be significantly less for a catadioptric zoom relay telescope according to the present invention than for a catadioptric zoom telescope of "non-relay" design. In accordance with the present invention, a dewar (or other type of cooling chamber) is dimensioned to enclose merely the Lyot stop, the field lens element and the detector.

DESCRIPTION OF THE DRAWING

FIG. 1 is a profile illustration of a catadioptric zoom relay telescope according to the present invention with a fixed aperture of 500 mm, and with movable lens elements positioned to provide a focal ratio of f/1.5, a focal length of 750 mm, and a field of view of 1.000 degree.

FIG. 2 is a schematic representation of the image plane of the catadioptric zoom relay telescope of the present invention on which an array of pixels indicating an array of corresponding photodetecting elements is illustrated.

FIG. 3 is a set of spot diagrams showing ray intercepts for three distinct wavelengths on four different pixels, as indicated by the darkened pixels in FIG. 2, on the image plane of the catadioptric zoom relay telescope of the present invention with the movable lens elements positioned as illustrated in FIG. 1.

FIG. 4 is a profile illustration of the catadioptric zoom relay telescope of FIG. 1 after the movable lens elements have changed positions (i.e., zoomed) to provide a focal ratio of f/3.0, a focal length of about 1500 mm, and a field of view of about 0.500 degree.

FIG. 5 is a reprise of FIG. 2 schematically representing the image plane of the catadioptric zoom relay telescope of the present invention on which an array of pixels indicating an array of corresponding photodetecting elements is illustrated.

FIG. 6 is a set of spot diagrams showing ray intercepts for three distinct wavelengths on four different pixels, as indicated by the darkened pixels in FIG. 5, on the image plane of the catadioptric zoom relay telescope of the present invention with the movable lens elements positioned as illustrated in FIG. 4.

FIG. 7 is a profile illustration of the catadioptric zoom relay telescope of FIG. 1 after the movable lens elements have changed positions (i.e., zoomed) to provide a focal ratio of f/4.5, a focal length of about 2250 mm, and a field of view of about 0.375 degree.

FIG. 8 is a reprise of FIGS. 2 and 5 schematically representating the image plane of the catadioptric zoom relay telescope of the present invention on which an array of pixels indicating an array of corresponding photodetecting elements is illustrated.

FIG. 9 is a set of spot diagrams showing ray intercepts for three distinct wavelengths on four different pixels, as indicated by the darkened pixels in FIG. 8, on the image plane of the catadioptric zoom relay telescope of the present invention with the movable lens elements positioned as illustrated in FIG. 7.

FIG. 10 is a profile illustration of the catadioptric zoom relay telescope of FIG. 1 after the movable lens elements have changed positions (i.e., zoomed) to provide a focal ratio of f/6.0, a focal length of about 3000 mm, and a field of view of about 0.250 degree.

FIG. 11 is a reprise of FIGS. 2, 5 and 8 schematically representing the image plane of the catadioptric zoom relay telescope of the present invention on which an array of pixels indicating an array of corresponding photodetecting elements is illustrated.

FIG. 12 is a set of spot diagrams showing ray intercepts for three distinct wavelengths on four different pixels, as indicated by the darkened pixels in FIG. 11, on the image plane of the catadioptric zoom relay telescope of the present invention with the movable lens elements positioned as illustrated in FIG. 10.

BEST MODE FOR CARRYING OUT THE INVENTION

As shown in FIG. 1, a catadioptric zoom relay telescope according to the present invention comprises a spherical primary mirror 20 for gathering rays of optical radiation from distinct objects, and a secondary Mangin mirror 21 for relaying the gathered rays through an aperture in the primary mirror 20 to an imaging system 22. The primary and secondary mirrors 20 and 21 are fixedly positioned with respect to each other along an optic axis, and four lens elements 23, 24, 25, and 26 comprising the imaging system 22 are positioned along the same optic axis. The perimeter of the primary mirror 20 defines the entrance pupil of the telescope; and the imaging system 22 forms an image of the primary mirror 20 on an intermediate plane (i.e., Lyot stop) 27, which coincides with the exit pupil of the telescope. Rays passing through the Lyot stop 27 are focussed by a field lens element 28 onto an image plane where a detector 29 is located.

The secondary Mangin mirror 21 comprises a lens component whose back surface (i.e., the surface facing away from the primary mirror 20) is silvered to form a convex mirror. The four lens elements 23, 24, 25 and 26 comprising the imaging system 22 are movable with respect to the mirrors 20 and 21 and with respect to each other along the optic axis. The field lens element 28 is stationary with respect to the mirrors 20 and 21. The aperture in the primary mirror 20, as well as the perimeters of the five lens elements 23, 24, 25, 26 and 28, are circularly symmetrical about the optic axis; and the positions assumed by the four movable lens elements 23, 24, 25 and 26 along the optic axis are determined by the particular focal ratio selected for the imaging system 22. The lens component of the Mangin mirror 21 and the five lens elements 23, 24 25, 26 and 28 are all made from the same type of optical material, which is selected primarily on the basis of cost and availability. Typical infrared-transmissive optical materials that could be used for the lens component of the Mangin mirror 21 and for the five lens elements 23, 24, 25, 26 and 28 include germanium, silicon, zinc sulfide, and zinc selenide.

Referring to FIG. 1, two non-parallel rays of infrared radiation from distant objects (e.g., stellar objects located at astromonical distances from the telescope) are shown incident upon a point 30 on the perimeter of the primary mirror 20. Two other non-parallel rays are shown incident upon another point 31 on the perimeter of the primary mirror 20 diametrically opposite the point 30. Also shown in FIG. 1 are two non-parallel rays incident upon a point 32 adjacent the aperture in the primary mirror 20, and two other non-parallel rays incident upon a point 33 likewise adjacent the aperture in the primary mirror 20 but symmetrically opposite the point 32 with respect to the optic axis. The rays reflected from the points 30, 31, 32 and 33 undergo refraction upon entering the lens component of the Mangin mirror 21, and again undergo refraction upon returning through the lens component of the Mangin mirror 21 after reflection from the silvered back surface thereof. The silvered back surface of the Mangin mirror 21 actually serves as the secondary mirror of the telescope.

Rays of infrared radiation reflected by the Mangin mirror 21 pass through the aperture in the primary mirror 20 into the lens system 22. The lens elements 23, 24, 25, and 26 of the imaging system 22 coact with each other to relay an image of the primary mirror 20 (substantially without chromatic aberration) onto the Lyot stop 27. The position of the Lyot stop 27 changes as with respect to the mirrors 20 and 21 as the positions of the movable lens elements 23, 24, 25 and 26 change to cause the telescope to zoom through a range of changes in focal ratio (i.e., from a focal ratio as low as f/1.5 or lower to a focal ratio as high as f/6.0 or higher). A particular embodiment of the present invention, which has been designed to have an entrance aperture (i.e., a diamenter of the primary mirror 20) of 500 mm, an effective focal length of 750 mm and a field of view of 1.000 degree, and for which the refractive elements (viz., the lens component of the Mangin mirror 21 and the five lens elements 23, 24, 25, 26 and 28) are made of germanium and are optimized for operation at a focal ratio of f/1.5 in the spectral bandwidth from 8 to 12 microns, is specified by an optical prescription as follows:

TABLE I

| Ref. No. in FIG. 1 | Surface No. | Element Diameter (mm) | Radius of Curvature (mm) | Distance Next to Surface (mm) | Medium Traversed to Next Surface |
|---|---|---|---|---|---|
| 20 | 1 | 500 | −1782.818 | −625.945 | Reflector |
| 21 | 2 | 170 | 13177.700 | −20.000 | Germanium |
|    | 3 | .   | −3439.984 | 20.000 | Reflector |
|    | 4 |     | 13177.700 | 613.819 | Air |
| 23 | 5 | 130 | 1614.909 | 20.000 | Germanium |
|    | 6 |     | −3963.493 | 277.110 | Air |
| 24 | 7 | 90 | −92.815 | 24.000 | Germanium |
|    | 8 |    | −98.305 | 107.703 | Air |
| 25 | 9 | 90 | 105.429 | 24.000 | Germanium |
|    | 10 |   | 227.389 | 11.203 | Air |
| 26 | 11 | 70 | 426.239 | 20.000 | Germanium |
|    | 12 |    | 108.985 | 10.004 | Air |
| 27 | 13 |    | ∞ | 58.081 | Air |
| 28 | 14 | 50 | 49.464 | 20.000 | Germanium |
|    | 15 |    | 65.014 | 14.076 | Air |
| 29 | 16 |    | ∞ |         | Detector | where the optically significant surfaces of the optical prescription are numbered consecutively along the path of optical radiation passing through the telescope, and where all surfaces are substantially spherical, except for Surface No. 13 (i.e., the Lyot step 27) and Surface No. 16 (i.e., the image plane where the detector 29 is located), which are planar.

The reflective surface of the primary mirror 20, which functions as the entrance aperture of the telescope, is listed in Table I as Surface No. 1. Rays reflected from Surface No. 1 pass from right to left toward the refractive front surface of the lens component of the Mangin mirror 21, which is listed in Table I as Surface No. 2. Rays entering the lens component of the Mangin mirror 21 pass toward the silvered (i.e., reflective) back surface thereof, which is listed in Table I as Surface No. 3. Rays reflected from Surface No. 3 pass from left to right through the lens component of the Mangin mirror 21, and are refracted for a second time at Surface No. 2 (which is accordingly listed for a second time in Table I, but with the designation Surface No. 4, where Surface No. 4 and Surface No. 2 are identical). The Mangin mirror 21 causes the rays to converge through the aperture in the primary mirror 20 toward the lens system 22.

The surfaces of the four movable lens elements 23, 24, 25 and 26 and of the stationary field lens element 28 (designated from left to right along the optic axis as shown in FIG. 1) are listed consecutively in Table I. Thus, Surface No. 5 and Surface No. 6 are the surfaces of the lens element 23; Surface No. 7 and Surface No. 8 are the surfaces of the lens element 24; Surface No. 9 and Surface No. 10 are the surfaces of the lens element 25; and Surface No. 11 and Surface No. 12 are the surfaces of the lens element 26. An image of the primary mirror 20 is formed at the exit pupil (i.e., the Lyot stop) 27, which is listed as Surface No. 13. The surfaces of the stationary field lens element 28 are listed as Surface No. 14 and Surface No. 15. The field lens element 28 focuses rays from the exit pupil (i.e., the Lyot stop) 27 onto an image plane at the surface of the detector 29, which is listed in Table I as Surface No. 16.

The radii of curvature and the axial separations between adjacent surfaces are expressed in millimeters in Table I. In accordance with optical design convention, the radius of curvature of a surface is positive if the center of curvature of the surface lies to the right of the surface, and negative if the center of curvature of the surface lies to the left of the surface. Similarly, an axial separation between two surfaces is positive if measured from left to right, and negative if measured from right to left.

Also shown in FIG. 1 is a cooling chamber 40, such as a dewar, which encloses the Lyot stop 27, the field lens element 28 and the detector 29. The cooling chamber 40 serves to suppress background radiation at the detector 29.

In FIG. 2, the image plane of the telescope of FIG. 1 at which the detector 29 is located is represented by a square consisting of four symmetrical quadrants. The detector 29 comprises a planar array of photodetecting elements arranged so as to form a corresponding array of regularly spaced pixels on the image plane. Four particular pixels (viz., the pixels at the corners of one of the quadrants of the square representing the image plane) are darkened in FIG. 2. Performance of the telescope whose lens elements are positioned as illustrated in FIG. 1 (as a function of wavelength and field of view for the particular values of focal ratio, focal length and field of view specified by the optical prescription given in Table I) is indicated in FIG. 3 by a set of four spot diagrams, which show ray intercepts for three distinct wavelengths at the four corresponding pixels on the image plane as indicated by the darkened pixels in FIG. 2.

The three wavelengths for which ray intercepts are shown in FIG. 3 are 8.0 microns (whose ray intercepts are represented by circles), 10.0 microns (whose ray intercepts are represented by triangles), and 12.0 microns (whose ray intercepts are represented by squares). The four-quadrant square of FIG. 2 representing the image plane is dimensioned to fill a field of view of 1.0 degree, and each pixel is a square of 100 microns on an edge. The lower right-hand pixel shown in FIG. 3 is the center pixel on the image plane as shown in FIG. 2, and all ray intercepts shown thereon have an RMS spot radius of about 0.0150 micron. The upper right-hand pixel shown in FIG. 3 is the uppermost pixel on the vertical axis separating the two upper quadrants on the image plane as shown in FIG. 2; and all ray intercepts shown thereon have an RMS spot radius of about 0.0139 micron. The upper left-hand pixel shown in FIG. 3 is the pixel that is shown in FIG. 2 in the upper left-hand corner of the image plane; and all ray intercepts shown thereon have an RMS spot radius of about 0.0139 micron. The lower left-hand pixel shown in FIG. 3 is the left-most pixel on the horizontal axis separating the upper left quadrant from the lower left quadrant on the image plane as shown in FIG. 2; and all ray intercepts shown thereon have an RMS spot radius of about 0.0139 micron.

The distribution of ray intercepts in the other pixels in the upper left-hand quadrant on the image plane, as indicated in FIG. 2, can be appreciated by extrapolation from the distributions shown in the four pixels illustrated in FIG. 3. Also, the distribution of ray intercepts in the pixels in the other three quadrants of the image plane can be appreciated by noting that the distributions are symmetrical with respect to the vertical and horizontal axes defining the quadrants. In FIG. 3, an Airy disk for the 12.0 micron wavelength is shown concentrically positioned on each pixel. It is noteworthy with respect to FIG. 3 that ray intercepts in the wavelength range from 8.0 microns to 12.0 microns are densely clustered within the Airy disk of 12-micron diameter over the image plane, which indicates diffraction-limited performance.

The positions of the lens elements 23, 24, 25 and 26 are variable along the optic axis by means of a conventional cam mechanism in order to change the focal ratio of the imaging system 22. Using $D_1$ to represent the axial separation between the Mangin mirror 21 and the lens element 23 (i.e., between Surface No. 4 and Surface No. 5), $D_2$ to represent the axial separation between the lens elements 23 and 24 (i.e., between Surface No. 6 and Surface No. 7), $D_3$ to represent the axial separation between the lens elements 24 and 25 (i.e., between Surface No. 8 and Surface No. 9), $D_4$ to represent the axial separation between the lens elements 25 and 26 (i.e., between Surface No. 10 and Surface No. 11), $D_5$ to represent the axial separation between the lens element 26 and the Lyot stop 27 (i.e., between Surface No. 12 and Surface No. 13), and $D_6$ to represent the axial separation between the Lyot stop 27 and the field lens element 28 (i.e., between Surface No. 13 and Surface No. 14), the positions of the lens elements 23, 24, 25 and 26 as shown in FIG. 1 are specified as follows:

TABLE II

| Lens Position | Separation (mm) |
| --- | --- |
| $D_1$ | 613.819 |
| $D_2$ | 277.110 |
| $D_3$ | 107.703 |
| $D_4$ | 11.203 |
| $D_5$ | 10.004 |
| $D_6$ | 58.081 | where the above-listed values for the separations between adjacent surfaces are repeated from the fifth column in Table I.

To zoom from the imagery obtained for a focal ratio of f/1.5, a focal length of 750 mm, and a field of view of 1.000 degree in the wavelength range from 8 to 12 microns (as provided by the positions specified in Table II for the movable lens elements 23, 24, 25 and 26) to an imagery that can be achieved for a focal ratio of f/3.0, a focal length of about 1500 mm (more precisely, 1501.9 mm), and a field of view of about 0.500 degree (more precisely, 0.48 degree), the positions of the lens elements 23, 24, 25 and 26 are changed so that the separations between adjacent surfaces are as follows:

TABLE III

| Lens Position | Separation (mm) |
| --- | --- |
| $D_1$ | 638.988 |
| $D_2$ | 245.098 |
| $D_3$ | 62.225 |
| $D_4$ | 16.599 |
| $D_5$ | 9.969 |
| $D_6$ | 105.037 |

The same telescope shown in FIG. 1 is also shown in FIG. 4, but with the positions of the movable lens elements 23, 24, 25 and 26 changed in accordance with the values listed in Table III for the separations between adjacent surfaces. The position of the Lyot stop 27 also changes as the movable lens elements 23, 24, 25 and 26 change position. However, it is a feature of the present invention that the position of the image plane (where the detector 29 is located) remains unchanged as movable lens elements 23, 24, 25 and 26 change position.

In FIG. 5, the image plane of the telescope is again represented by a square consisting of four symmetrical quadrants. FIG. 5 is a reprise of FIG. 2, because the image plane does not change as the telescope zooms to achieve imagery at different focal ratios. In FIG. 6, performance of the telescope with the movable lens elements 23, 24, 25 and 26 in the positions indicated in FIG. 4, and with separations between adjacent surfaces as specified in Table III, is illustrated as a function of wavelength and field of view by means of a corresponding set of spot diagrams in which ray intercepts at the image plane are shown.

The three wavelengths for which ray intercepts are shown in FIG. 6 are likewise 8.0 microns (whose ray intercepts are represented by circles), 10.0 microns (whose ray intercepts are represented by triangles), and 12.0 microns (whose ray intercepts are represented by squares). The four-quadrant square of FIG. 5 representing the image plane is dimensioned to fill a field of view of 0.500 degree, and each pixel is a square of 200 microns on an edge. The lower right-hand pixel shown in FIG. 6 is the center pixel on the image plane as shown in FIG. 5; and all ray intercepts shown thereon have an RMS spot radius of about 0.0374 micron. The upper right-hand pixel shown in FIG. 6 is the uppermost pixel on the vertical axis separating the two upper quadrants on the image plane as shown in FIG. 5; and all ray intercepts shown thereon have an RMS spot radius of about 0.0346 micron. The upper left-hand pixel shown in FIG. 6 is the pixel that is shown in FIG. 5 in the upper left-hand corner of the image plane; and all ray intercepts shown thereon have an RMS spot radius of about 0.0443 micron. The lower left-hand pixel shown in FIG. 6 is the left-most pixel on the horizontal axis separating the upper left quadrant from the lower left quadrant on the image plane as shown in FIG. 5; and all ray intercepts shown thereon have an RMS spot radius of about 0.0346 micron.

The distribution of ray intercepts in the other pixels in the upper left-hand quadrant on the image plane, as indicated in FIG. 5, can be appreciated by extrapolation from the distributions shown in the four pixels illustrated in FIG. 6. Also, the distribution of ray intercepts in the pixels in the other three quadrants of the image plane can be appreciated by noting that the distributions are symmetrical with respect to the vertical and horizontal axes defining the quadrants. In FIG. 6, an Airy disk for the 12.0 micron wavelength is shown concentrically positioned on each pixel. It is noteworthy with respect to FIG. 6 that ray intercepts in the wavelength range from 8.0 microns to 12.0 microns are still clustered in the vicinity of the Airy disk of 12-micron diameter over most of the image plane, which indicates substantially diffraction-limited performance.

To zoom further to an imagery corresponding to a focal ratio of f/4.5, a focal length of about 2250 mm (more precisely, 2243.7 mm), and a field of view of about 0.375 degree (more precisely, 0.32 degree), the positions of the movable lens elements 23, 24, 25 and 26 are changed so that the separations between adjacent surfaces are as follows:

TABLE IV

| Lens Position | Separation (mm) |
| --- | --- |
| $D_1$ | 559.611 |
| $D_2$ | 259.858 |
| $D_3$ | 39.808 |
| $D_4$ | 18.702 |
| $D_5$ | 9.965 |
| $D_6$ | 189.950 |

The same telescope shown in FIG. 1 is next shown in FIG. 7, but with the positions of the movable lens elements 23, 24, 25 and 26 changed in accordance with the values listed in Table IV for the separations between adjacent surfaces. The position of the Lyot stop 27 accordingly also changes, but the position of the image plane where the detector 29 is located remains unchanged. The image plane is represented as a four-quadrant square in FIG. 8, which is essentially a reprise of FIGS. 2 and 5 because the image plane does not change as the telescope zooms to achieve imagery at different focal ratios.

In FIG. 9, performance of the telescope with the movable lens elements 23, 24, 25 and 26 in the positions indicated in FIG. 7, and with separations between adjacent surfaces as specified in Table IV, is illustrated as a function of wavelength and field of view by means of a corresponding set of spot diagrams in which ray intercepts at the image plane are shown. The three wavelengths for which ray intercepts are shown in FIG. 9 are 8.0 microns (whose ray intercepts are represented by circles), 10.0 microns (whose ray intercepts are represented by triangles), and 12.0 microns (whose ray intercepts are represented by squares). The four-quadrant square of FIG. 8 representing the image plane is dimensioned to fill a field of view of 0.375 degree, and each pixel is a square of 200 microns on an edge. The lower right-hand pixel shown in FIG. 9 is the center pixel on the image plane as shown in FIG. 8; and all ray intercepts shown thereon have an RMS spot radius of about 0.0178 micron. The upper right-hand pixel shown in FIG. 9 is the uppermost pixel on the vertical axis separating the two upper quadrants on the image plane as shown in FIG. 8; and all ray intercepts shown thereon have an RMS spot radius of about 0.0186 micron. The upper left-hand pixel shown in FIG. 9 is the pixel that is shown in FIG. 8 in the upper left-hand corner of the image plane; and all ray intercepts shown thereon have an RMS spot radius of about 0.0235 micron. The lower left-hand pixel shown in FIG. 9 is the left-most pixel on the horizontal axis separating the upper left quadrant from the lower left quadrant on the image plane as shown in FIG. 8; and all ray intercepts shown thereon have an RMS spot radius of about 0.0186 micron.

The distribution of ray intercepts in the other pixels in the upper left-hand quadrant on the image plane, as indicated in FIG. 8, can be appreciated by extrapolation from the distributions shown in the four pixels illustrated in FIG. 9. Also, the distribution of ray intercepts in the pixels in the other three quadrants of the image plane can be appreciated by noting that the distributions are symmetrical with respect to the vertical and horizontal axes defining the quadrants. In FIG. 9, an Airy disk for the 12.0 micron wavelength is shown concentrically positioned on each pixel. It is noteworthy with respect to FIG. 9 that the ray intercepts in the wavelength range from 8.0 microns to 12.0 microns are tightly clustered well within the Airy disk of 12-micron diameter over the entire image plane, which indicates diffraction-limited performance.

To zoom still further to an imagery corresponding to a focal ratio of f/6.0, a focal length of about 3000 mm (more precisely, 3009.7 mm), and a field of view of about 0.250 degree (more precisely, 0.24 degree), the positions of the movable lens elements 23, 24, 25 and 26 are changed so that the separations between adjacent surfaces are as follows:

TABLE V

| Lens Position | Separation (mm) |
|---|---|
| $D_1$ | 524.552 |
| $D_2$ | 272.413 |
| $D_3$ | 2.705 |
| $D_4$ | 20.889 |
| $D_5$ | 9.958 |
| $D_6$ | 247.502 |

The same telescope shown in FIG. 1 is finally shown in FIG. 10, but with the positions of the movable lens elements 23, 24, 25 and 26 changed in accordance with the values listed in Table V for the separations between adjacent surfaces. Again, the position of the Lyot stop 27 changes, but the position of the image plane where the detector 29 is located still remains unchanged. The image plane is again represented as a four-quadrant square in FIG. 11, which is essentially a reprise of FIGS. 2, 5 and 8, because the image plane does not change as the telescope zooms to achieve imagery at different focal ratios.

In FIG. 12, performance of the telescope with the movable lens elements 23, 24, 25 and 26 in the positions indicated in FIG. 10, and with separations between adjacent surfaces as specified in Table V, is illustrated as a function of wavelength and field of view by means of a corresponding set of spot diagrams in which ray intercepts at the image plane are shown. The three wavelengths for which ray intercepts are shown in FIG. 12 are 8.0 microns (whose ray intercepts are represented by circles), 10.0 microns (whose ray intercepts are represented by triangles), and 12.0 microns (whose ray intercepts are represented by squares). The four-quadrant square of FIG. 11 representing the image plane is dimensioned to fill a field of view of 0.250 degree, and each pixel is a square of 200 microns on an edge. The lower right-hand pixel shown in FIG. 12 is the center pixel on the image plane as shown in FIG. 11; and all ray intercept shown thereon have an RMS spot radius of about 0.0280 micron. The upper right-hand pixel shown in FIG. 12 is the uppermost pixel on the vertical axis separating the two upper quadrants on the image plane as shown in FIG. 11; and all ray intercepts shown thereon have an RMS spot radius of about 0.0254 micron. The upper left-hand pixel shown in FIG. 12 is the pixel that is shown in FIG. 11 in the upper left-hand corner of the image plane; and all ray intercepts shown thereon have an RMS spot radius of about 0.0461 micron. The lower left-hand pixel shown in FIG. 12 is the left-most pixel on the horizontal axis separating the upper left quadrant from the lower left quadrant on the image plane as shown in FIG. 11; and all ray intercepts shown thereon have an RMS spot radius of about 0.0254 micron.

The distribution of ray intercepts in the other pixels in the upper left-hand quadrant on the image plane, as indicated in FIG. 11, can be appreciated by extrapolation from the distributions shown in the four pixels illustrated in FIG. 12. Also, the distribution of ray intercepts in the pixels in the other three quadrants of the image plane can be appreciated by noting that the distributions are symmetrical with respect to the vertical and horizontal axes defining the quadrants. In FIG. 12, an Airy disk for the 12.0 micron wavelength is shown concentrically positioned on each pixel. It is noteworthy with respect to FIG. 12 that the ray intercepts in the wavelength range from 8.0 microns to 12.0 microns are clustered mostly within the Airy disk of 12-micron diameter over the entire image plane, which indicates diffraction-limited performance.

Appropriate positions for the movable lens elements 23, 24, 25 and 26 to achieve focal ratios, focal lengths and fields of view with values between those obtained when the movable lens elements 23, 24, 25 and 26 are in the positions indicated in Tables II, III, IV and V can be determined by extrapolation. The positions of the movable lens elements 23, 24, 25 and 26 can be simultaneously changed by a conventional cam mechanism so as to produce a continuous zoom range from less than f/1.5 to more than f/6.0.

The present invention has been described and illustrated herein by a single embodiment. However, optical designers skilled in the art, upon perusing the foregoing description and accompanying drawing, could modify the disclosed embodiment to accommodate particular applications. Thus, for example, the optical prescription given in Table I could be re-optimized for operation at the same focal ratio of f/1.5, the same effective focal length of about 750 mm, and the same field of view of about 1.000 degree, but in the spectral bandwidth from 3 to 5 microns. It would then be a routine task to determine appropriate separations between adjacent surfaces in order to achieve imagery for different focal ratios such as, for example, f/3.0, f/4.5, and f/6.0, and for corresponding focal lengths and fields of view. Accordingly, the foregoing description and accompanying drawing are to be considered as merely illustrative of the invention, which is defined more broadly by the following claims and their equivalents.

I claim:

1. A catadioptric zoom relay telescope capable of achieving a continuously variable focal length over a band of infrared wavelengths, said telescope comprising a primary mirror for gathering rays in said infrared wavelength band, a secondary Mangin mirror for directing said rays through an aperture in said primary mirror, said primary mirror and said secondary Mangin mirror being coaxially disposed along an optical axis, said aperture in said primary mirror being substantially symmetric about said optic axis, an imaging system comprising movable lens elements disposed along said optic axis to form a real image of said primary mirror at a Lyot stop, said Lyot stop being disposed along said optic axis externally of said imaging system, and field lens means disposed along said optic axis to focus rays passed by said Lyot stop onto a detector, said field lens means being fixedly positioned relative to said primary mirror and said secondary Mangin mirror.

2. The telescope of claim 1 having a design form in which said mirrors, said imaging system and said field lens means are configured so that said telescope can maintain substantially diffraction-limited imagery over said infrared wavelength band throughout a range of changes in focal ratio from less than f/1.5 to more than f/6.0.

3. The telescope of claim 1 wherein a refractive component of said secondary Mangin Mirror, as well as said imaging system and said field lens means, are made of substantially the same optical material, said refractive components being configured so as to achieve minimal chromatic aberration over said infrared wavelength band for a plurality of different positions of said movable lens elements of said imaging system.

4. The telescope of claim 3 wherein said refractive components of said telescope are all made of germanium.

5. The telescope of claim 2 wherein said imaging system comprises four movable lens elements, said primary mirror having a generally circular perimeter with a diameter of 500 mm, said design form being optimized for operation at a focal ratio of f/1.5 with an effective focal length of 750 mm and a field of view of 1.000 degree in a spectral bandwidth from 8 to 12 microns.

6. The telescope of claim 5 wherein said design form is substantially in accord with an optical prescription expressed in tabular format as follows:

| Surface [No.] Order | Element Diameter (mm) | Radius of Curvature (mm) | Distance to Next Surface (mm) |
| --- | --- | --- | --- |
| 1st | 500 | −1782.818 | −625.945 |
| 2nd | 170 | 13177.700 | −20.000 |
| 3rd | | −3439.984 | 20.000 |
| 4th | | 13177.700 | 613.819 |
| 5th | 130 | 1614.909 | 20.000 |
| 6th | | −3963.493 | 277.110 |
| 7th | 90 | −92.815 | 24.000 |
| 8th | | −98.305 | 107.703 |
| 9th | 90 | 105.429 | 24.000 |
| 10th | | 227.389 | 11.203 |
| 11th | 70 | 426.239 | 20.000 |
| 12th | | 108.985 | 10.004 |
| 13th | | ∞ | 58.081 |
| 14th | 50 | 49.464 | 20.000 |
| 15th | | 65.014 | 14.076 | where optically significant surfaces of said telescope are listed in the column headed "Surface Order" in consecutive order along the direction of propagation of said rays through said telescope; where the columns headed "Element Diameter", "Radius of Curvature" and "Distance to Next Surface" provide dimensions expressed in millimeters, where positive and negative designations for the radii of curvature correspond to positive and negative curvatures for the respective surface, where all curved surfaces are spherical; and where the 13th surface represents said Lyot stop.

7. The telescope of claim 6 wherein a focal ratio of f/3.0, a focal length of approximately 1500 mm, and a field of view of approximately 0.500 degree can be achieved by moving said movable lens elements so that the distance between Surface No. 4 and Surface No. 5 is approximately 638.988 mm, the distance between Surface No. 6 and Surface No. 7 is approximately 245.098 mm, the distance between Surface No. 8 and Surface No. 9 is approximately 62.225 mm, the distance between Surface No. 10 and Surface No. 11 is approximately 16.599 mm, the distance between Surface No. 12 and Surface No. 13 is approximately 9.969 mm, and the distance between Surface No. 13 and Surface No. 14 is approximately 105.037 mm.

8. The telescope of claim 6 wherein a focal ratio of f/4.5, a focal length of approximately 32250 mm, and a field of view of approximately 0.375 degree can be achieved by moving said movable lens elements so that the distance between Surface No. 4 and Surface No. 5 is approximately 559.611 mm, the distance between Surface No. 6 and Surface No. 7 is approximately 259.858 mm, the distance between Surface No. 8 and Surface No. 9 is approximately 39.808 mm, the distance between Surface No. 10 and Surface No. 11 is approximately 18.702 mm, the distance between Surface No. 12 and Surface No. 13 is approximately 9.965 mm, and the distance between Surface No. 13 and Surface No. 14 is approximately 189.905 mm.

9. The telescope of claim 6 wherein a focal ratio of f/6.0, a focal length of approximately 3000 mm, and a field of view of approximately 0.250 degree can be achieved by moving said movable lens elements so that the distance between Surface No. 4 and Surface No. 5 is approximately 524.552 mm, the distance between Surface No. 6 and Surface No. 7 is approximately 272.413 mm, the distance between Surface No. 8 and Surface No. 9 is approximately 2.705 mm, the distance between Surface No. 10 and Surface No. 11 is approximately 20.889 mm, the distance between Surface No. 12 and Surface No. 13 is approximately 9.958 mm, and the distance between Surface No. 13 and Surface No. 14 is approximately 247.502 mm.

10. An infrared telescope system comprising:
   a) a catadioptric zoom relay telescope capable of achieving a continuously variable focal length over a band of infrared wavelengths while maintaining substantially diffraction-limited imagery throughout a range of changes in focal ratio, said telescope comprising:
      (i) mirror means defining an entrance pupil for said telescope;
      (ii) an imaging system comprising a plurality of movable lens elements disposed so as to form a real image of said entrance pupil at an exit pupil of said telescope, said lens elements of said imaging system being movable relative to said mirror means and relative to each other;
      (iii) a Lyot stop located at said exit pupil, said Lyot stop being movable relative to said mirror means;
      (iv) a detector; and
      (v) field lens means disposed to form an image of said exit pupil on said detector; and
   b) cooling means enclosing said Lyot stop, said field lens means and said detector to suppress background radiation at said detector.

11. The infrared telescope system of claim 10 wherein said mirror means defining said entrance pupil comprises a primary mirror for gathering rays in said infrared wavelength band, and a secondary Mangin mirror for directing said rays through an aperture in said primary mirror, said primary mirror and said secondary Mangin mirror being coaxially disposed along an optic axis, said aperture in said primary mirror being substantially symmetric about said optic axis.

12. The infrared telescope system of claim 11 wherein said field lens means consists of a single lens element that focusses rays passed by said Lyot stop onto said detector.

13. The infrared telescope system of claim 10 wherein said mirror means, said imaging system and said field lens means are configured so that said telescope can maintain substantially diffraction-limited imagery over said infrared wavelength band throughout a range of changes in focal ratio from less than f/1.5 to more than f/6.0.

14. The infrared telescope system of claim 10 wherein said cooling means comprises a dewar.

15. An infrared catadioptric zoom relay telescope capable of achieving a continuously variable focal length over a band of infrared wavelengths while maintaining substantially diffraction-limited imagery throughout a range of changes in focal ratio, said telescope comprising:

(a) mirror means defining an entrance pupil for said telescope;
(b) an imaging system comprising a plurality of movable lens elements disposed so as to form a real image of said entrance pupil at an exit pupil of said telescope, said lens elements of said imaging system being movable relative to said mirror means and relative to each other;
(c) a Lyot stop located at said exit pupil, said Lyot stop being movable relative to said mirror means;
(d) a detector; and
(e) field lens means disposed to form an image of said exit pupil on said detector.

* * * * *